(12) United States Patent
Sharma

(10) Patent No.: US 9,978,039 B1
(45) Date of Patent: May 22, 2018

(54) DOCUMENT GATEWAY SYSTEM TO CLOUD-BASED DOCUMENT REPOSITORY

(71) Applicant: Ashutosh Mohan Sharma, Fremont, CA (US)

(72) Inventor: Ashutosh Mohan Sharma, Fremont, CA (US)

( * ) Notice: Subject to any disclaimer, the term of this patent is extended or adjusted under 35 U.S.C. 154(b) by 374 days.

(21) Appl. No.: 14/693,856

(22) Filed: Apr. 22, 2015

(51) Int. Cl.
G06F 3/12 (2006.01)
G06Q 10/10 (2012.01)
H04N 1/00 (2006.01)

(52) U.S. Cl.
CPC ........... G06Q 10/10 (2013.01); G06F 3/1243 (2013.01); G06F 3/1284 (2013.01); H04N 1/00209 (2013.01)

(58) Field of Classification Search
CPC .... G06Q 10/10; G06Q 20/32; G06Q 20/0453; G06Q 20/20; G06Q 20/0457; G06F 3/1243; G06F 3/1284; H04N 1/00209; H04N 21/4147; H04N 21/4223; G07F 17/42
USPC ........................................................ 358/1.15
See application file for complete search history.

(56) References Cited

U.S. PATENT DOCUMENTS

| | | | |
|---|---|---|---|
| 7,797,192 B2 | 9/2010 | Mitchell et al. | |
| 7,856,646 B1 | 12/2010 | Groff et al. | |
| 8,370,916 B2 | 2/2013 | Yuan et al. | |
| 8,548,859 B2 | 10/2013 | Matkovic | |
| 8,728,454 B1 | 5/2014 | Argue | |
| 8,788,828 B2 | 7/2014 | van Herrewegen | |
| 2003/0055733 A1 | 3/2003 | Marshall et al. | |
| 2011/0112898 A1* | 5/2011 | White | G06Q 20/202 705/14.38 |
| 2014/0058861 A1* | 2/2014 | Argue | G07F 17/42 705/18 |
| 2014/0067676 A1 | 3/2014 | Woodall et al. | |
| 2014/0180805 A1* | 6/2014 | Argue | G06Q 30/0241 705/14.53 |

(Continued)

FOREIGN PATENT DOCUMENTS

EP   1 209 601 A2   5/2002

OTHER PUBLICATIONS

"Assign a Profile to a Customer in the Address Book", http://www.ups.com/worldshiphelp/WS12/ENU/AppHelp/TOOLS/Assign_a_Profile_to_a_Customer_in_the_Address_Book.htm, May 26, 2015.

(Continued)

Primary Examiner — Neil R McLean
(74) Attorney, Agent, or Firm — Clifton Leon Anderson

(57) ABSTRACT

A document management system includes a document gateway disposed between a document provider and a printer. When the document gateway receives a print-ready document from the document provider, the document gateway determines whether to cause the document to be uploaded to a cloud-based document repository or to be printed to yield a hardcopy document. This determination is made based on an indication from a document consumer and using a consumer device such as a smartphone or customer card, that the document consumer wishes a digital copy of the document. If the document is uploaded, the consumer benefits from having documents uploaded to a centralized repository, while the vendor benefits from obtaining consumer profile information at negligible acquisition cost. Additional embodiments are disclosed.

15 Claims, 4 Drawing Sheets

(56) References Cited

U.S. PATENT DOCUMENTS

| | | | |
|---|---|---|---|
| 2015/0025986 A1* | 1/2015 | Patel | G06Q 30/0207 |
| | | | 705/16 |
| 2015/0046276 A1* | 2/2015 | Artman | G06Q 20/202 |
| | | | 705/21 |
| 2015/0058186 A1 | 2/2015 | Argue et al. | |
| 2015/0134454 A1* | 5/2015 | Sandbrook | G06Q 30/0261 |
| | | | 705/14.58 |
| 2015/0332415 A1* | 11/2015 | Johansen | G06Q 40/02 |
| | | | 705/30 |

OTHER PUBLICATIONS

"Customer profile" Business English Dictionary, Cambridge Dictionaries Online, http://dictionary.cambridge.org/dictionary/businessenglish/customerprofile, May 26, 2015.

"Definition of customer profile", Collins English Dictionary, http://www.collinsdictionary.com/dictionary/english/customerprofile, May 26, 2015.

"What is customer profile? definition and meaning", BusinessDictionary.com, http://www.businessdictionary.com/definition/customerprofile.html, May 26, 2015.

"Profile_Definition of profile by Merriam-Webster", http://www.merriam-webster.com/dictionary/profile, Jul. 3, 2015.

Ting, Richard, "The Customer Profile: Your Brand's Secret Weapon", Harvard Business Review, Mar. 11, 2013, https://hbr.org/2013/03/the-customer-profile-your-bran/, Jul. 3, 2015.

Alesco Data, "How to Create a Best Customer Profile", http://alescodata.com/best-customer-profile.html, Jul. 3, 2015.

The Whole Brain Group, "Five Simple Steps to Creating an Ideal Customer Profile", Whole Brain Blog, Jun. 27, 2012, http://blog.thewholebraingroup.com/steps-to-creating-an-ideal-customer-profile, printed Jul. 3, 2015.

"Unified Customer Profile", https://blackbox4.files.wordpress.com/2013/07/custuni-copy.jpg, Jul. 3, 2014.

* cited by examiner

DOCUMENT GATEWAY SYSTEM TO CLOUD-BASED DOCUMENT REPOSITORY

BACKGROUND

Persons may accumulate a variety of paper documents such as store receipts, restaurant receipts, coupons, advertisements, automobile repair estimates, and medical lab reports. These documents may be stored collectively, or sorted and stored in categories, or just thrown out. In any event, the handling of the paper documents can be a burden. Organizing the documents can be time consuming. Retrieving the documents to obtain information contained to therein can be tedious; one problem being that a person generally has to be at the location of the document to retrieve it.

Paper documents can be digitized, i.e., scanned, at various levels of sophistication to facilitate document and information management. Once paper documents are scanned, the resulting document images can easily be stored, arranged in computer directories, electronically copied and communicated. Herein, "computer" encompasses devices and systems in which processors manipulate physically encoded data in accordance with physically encoded instructions, wherein the data and instructions are stored in computer-readable storage media. However, the scanning and other steps to organize documents can be burdensome.

Some vendors provide an option for electronic receipts to be sent by email. Email receipts can obviate the need for scanning, but there is still a problem of manually spelling out the email id at the Point of Sale on a device or on the paper form, and organizing receipts from a single vendor, let alone from multiple vendors. What is needed is a more convenient system for sharing the consumer id with the vendors and storing, organizing, and analyzing receipts and other documents that vendors may provide to a customer or other document consumer.

DETAILED DESCRIPTION

Figure 1:
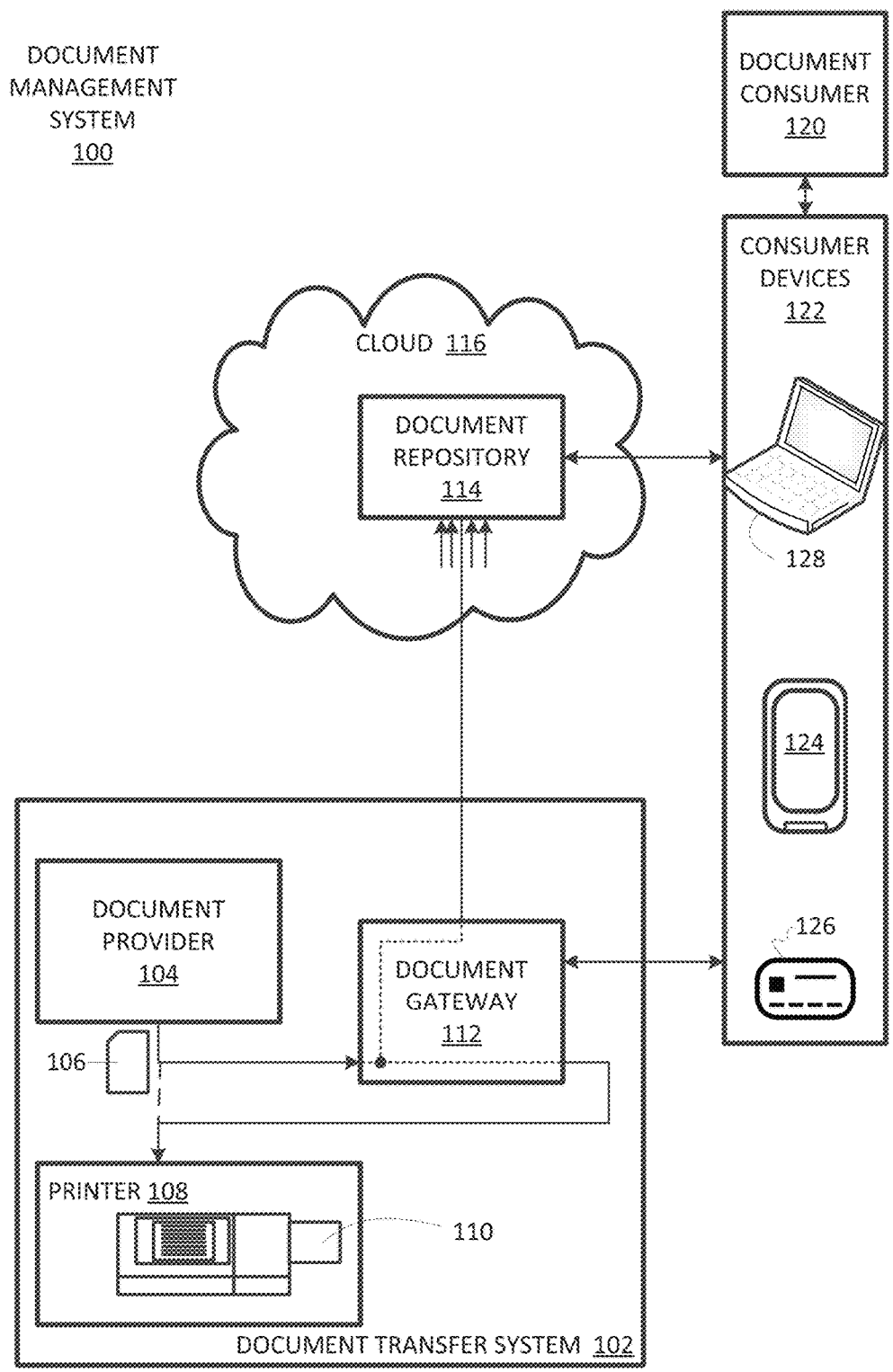
FIG. 1 is a schematic diagram of a document management system.

The present invention provides a document gateway for uploading documents to a cloud-based document repository for storage. The documents can include financial transaction documents, and other documents that may be supplied by a document provider to a document consumer. A sales receipt is a familiar example of a transaction document. Examples of non-transaction documents include coupons, gift cards, agreements, contracts, flyers, medical reports, medical/non-medical images, medical scans, and medical x-rays. Metadata associated with respective document can be used to index stored documents to facilitate searching. Once documents are uploaded, a document consumer can access and search them using a consumer device (e.g., smartphone, laptop, tablet, smartwatch). Thus, the consumer is relieved of the burdens of handling paper documents and organizing paper and electronic documents.

A document management system 100 in accordance with the invention includes a document transfer system 102, including a document provider 104 for providing a print-ready document 106, a printer 108 for providing a hard copy 110 of a document, and a document gateway 112 for transferring the print-ready document to a document repository 114 in the cloud 116. Printer 108 is coupled to document provider 104 via document gateway 112, which is thus in a position to determine whether a print-ready document is printed or uploaded to document repository 114.

Document gateway 112 determines whether to print or to upload a document based on an input (or lack thereof) by the intended consumer 120 for the document. In a sense, document gateway 112 presents an opportunity to consumer 120 to have the document uploaded to document repository 114 rather than printed and handed to consumer 120. Consumer 120 may accept this opportunity by providing an affirmative indication using a handheld consumer device 122, such as a smartphone 124 or a consumer card 126, or a tablet, or a smartwatch. For example, consumer 120 may tap document gateway 112 with smartphone 124 or other smart device to initiate a Near-Field Communication (NFC) indicating acceptance. Alternatively, consumer 120 may cause document gateway 112 to read consumer card 126. A lapse of time without an acceptance or an affirmative rejection of the opportunity can cause the document to be printed rather than uploaded. In some embodiments, a consumer may elect to have the document both printed and uploaded.

Once a document has been uploaded to document repository 114, a consumer may access it using a consumer device 122 such as smartphone 124, a computer 128, a tablet, or other consumer device. As indicated by the multiple arrows into document repository 114, there can be more than one source for documents in repository 114. Thus, documents from multiple providers can be gathered in one convenient location.

Instead of immediate printing or uploading, a document may be transferred from document gateway 112 to a consumer device, such as smartphone 124, for processing. For example, a credit card receipt can be signed or otherwise annotated on a smartphone and then transferred back to document gateway 112 for uploading or printing. In some embodiments, the document can be uploaded to document repository 114 via a smartphone rather than directly from document gateway 112. For example, a document provider may choose (e.g., for security reasons) not to implement a direct connection between a document gateway and the cloud. In such a case, the document may be uploaded via a cellular network using the consumer's smartphone or a smartwatch.

In document management system 100, document gateway 112 is separate from document provider 104 and printer 108. However, in alternative embodiments, a document gateway can be integrated within either a document provider or a printer.

A document management system 200 for a retail context can include a document transfer system in the form of a point-of-sale (POS) system 202. POS system 202 can include a payment gateway 204, a transaction register 206 that provides print-ready receipts, coupons, and other documents 208, a document gateway 210, and a printer 212 that provides hard copies 214 of documents provided by transaction register 206.

Document gateway 210 determines whether a print-ready document 208 received from transaction register 206 is to be uploaded to a document repository 216 or forwarded to printer 212. This determination is based on a consumer (e.g., customer) preference. For example, a consumer may communicate using an NFC protocol with a smartphone 220 or by swiping a consumer (e.g., credit, debit, or loyalty) card 222 that a receipt is to be uploaded to document repository 216, or transferred to smartphone 220 for forwarding to document repository 216 in the cloud 218. Note that while POS system 202 includes a single printer 212, alternative embodiments include more than one printer, e.g., a printer for receipts and another printer for coupons. In such cases, a document gateway can allow uploading to a document repository for documents directed to both or all printers.

In either case, the communication identifies and provides profile information on the consumer that can be transferred to the document provider's, e.g., the merchant's marketing system 224 for analysis and future marketing efforts. The consumer may indicate using the smartphone 220 based application whether the consumer would like to receive the promotional material from the vendor on the consumer id that has been shared. In alternative embodiments, a document gateway can be built into a payment gateway, a transaction register, or a printer.

Once a document 208 is uploaded to document repository 216, it joins other documents 226 for the same consumer. Document repository 216 can include an index 228 that indexes the documents and associates various types of metadata with each document. The metadata can include a document serial number, a document-type identifier, a time and date stamp, a merchant identifier, and a point-of-sale identifier to aid in searching documents 226.

Uploading documents to the cloud provides a device-independent access for managing multiple documents for multiple transactions with multiple vendors without having to separately scan, perform an OCR (optical character recognition) or compile the transaction documents. In exchange for this vendor-provided service, the customer shares identity and profile information that the vendor can use for marketing purposes. The data comes pre-formatted for printing on any given type of paper-printer machine.

The consumer can use various consumer devices 230 to access repository documents 226. For example, smartphone 220 can host an app that allows direct access to documents 226. Alternatively, smartphone 220, a computer 232, a tablet, or other consumer device can access the documents via a document service website 234.

Figure 3:
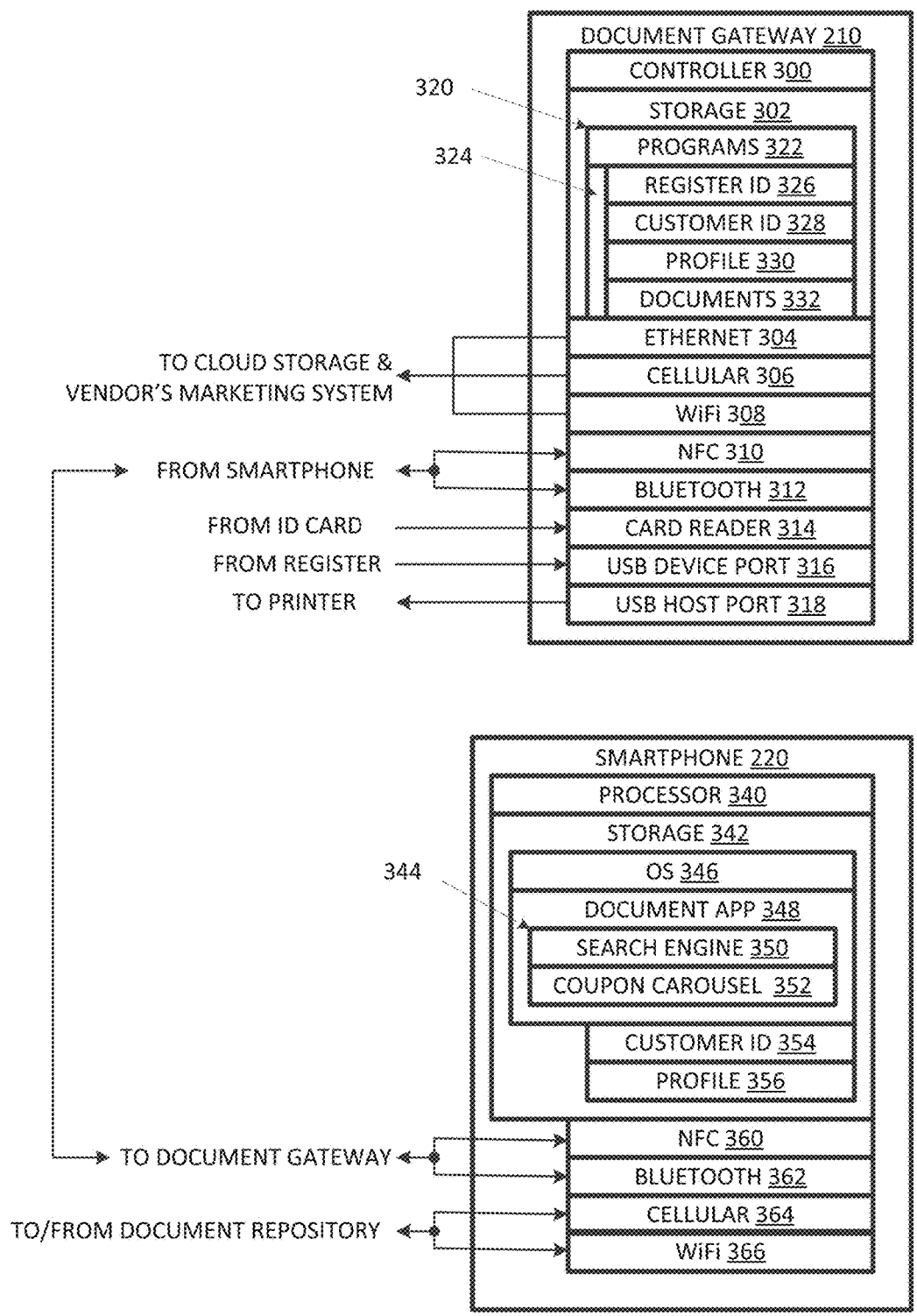
FIG. 3 is a schematic diagram depicting a document gateway and a smartphone of the merchant document management system of FIG. 2.

As shown in FIG. 3, document gateway 210 includes a controller 300, storage 302, an Ethernet interface 304, a Bluetooth interface, a cellular interface 306, a Wi-Fi interface 308, a near-field communications (NFC) port 310, a Bluetooth interface 312, a card reader 314, a USB device port 316, and a USB host port 318. In alternative embodiments, one or two parallel ports can be provided instead of or in addition to the USB ports as printer interfaces. Also, some alternative embodiments provide a Magnetic Secure Transmission (MST) interface for communication with a consumer device.

Figure 2:
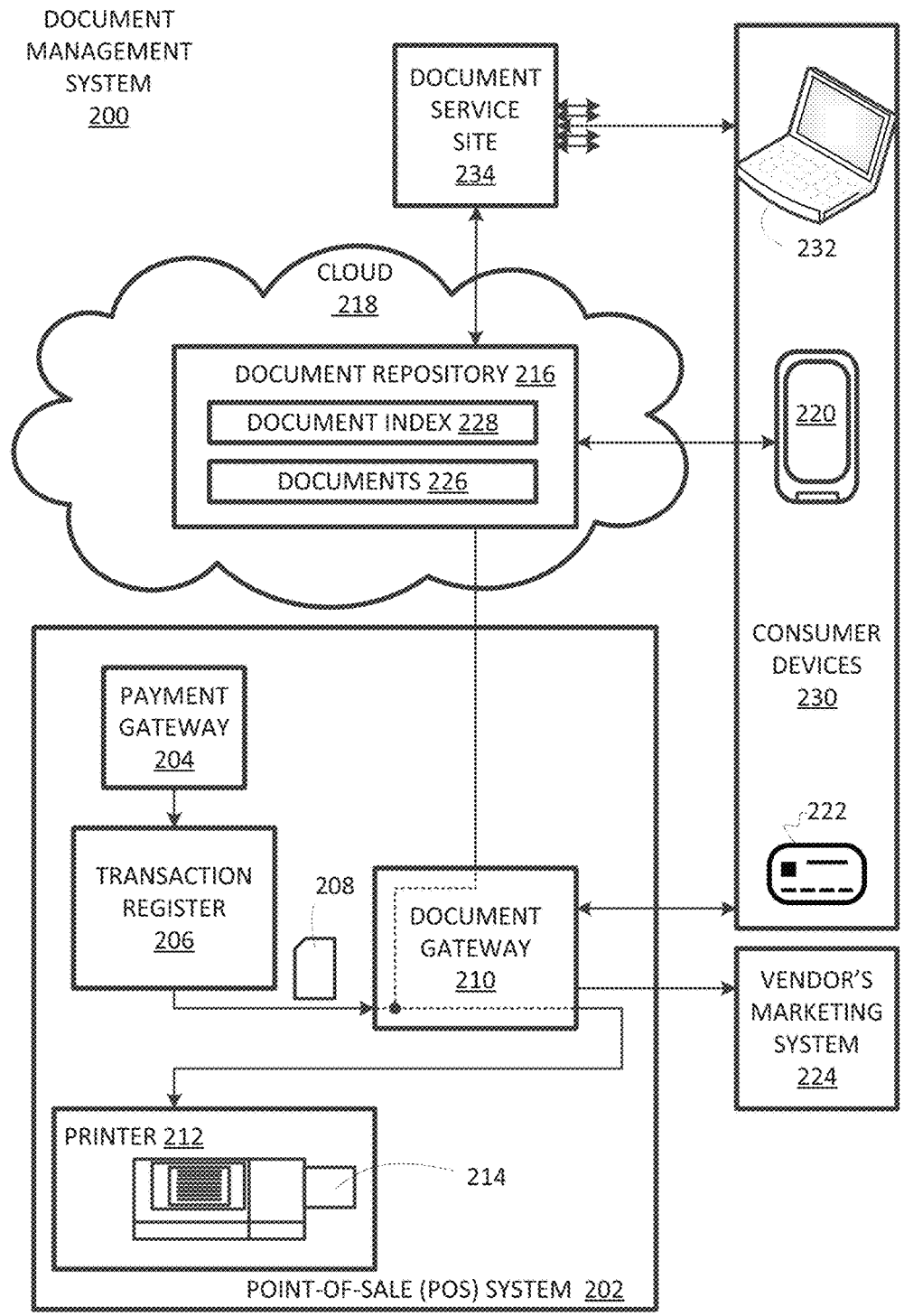
FIG. 2 is a schematic diagram of a merchant document management system.

Non-transitory storage 302 is physically encoded with controller-readable code 320; code 320 includes controller-executable programs 322, for operating document gateway 210, and a data structure 324. Data structure 324 is used for storing a register identifier (ID) 326 identifying transaction register 206, a customer identifier 328 identifying a current customer, a profile 330 for the identified customer, and documents 332. Register identifier 326 and documents 332 can be provided by transaction register 206, while customer identifier 328 and customer profile 330 can be provided by smartphone 220 or other consumer device 230 (FIG. 2).

As shown in FIG. 3, a customer device 230, such as smartphone 220 or a tablet, can include a processor 340, non-transitory storage 342 encoded with code 344 representing an operating system 346, a document application (app) 348, a customer identifier (ID) 350, and a customer profile 352. Smartphone 330 includes an NFC interface 360 over which customer ID 354 and customer profile 356 can be communicated to document gateway 210 to yield customer ID 328 and customer profile 330. Over Bluetooth on a merchant phone and document gateway, a merchant ID and a network profile can be communicated to the document gateway. The communication can also be bi-directional to transfer data to the smartphone or a tablet or a card in case the Ethernet/Wi-Fi is not available to the document gateway. Smartphone 220 further includes a cellular interface 364 and a Wi-Fi interface 366 over which smartphone 110 can access documents stored at document repository 216, either directly using app 348 or via document service site 234 using a browser.

Coupon carousel 352 allows a consumer to present a sequence or "slideshow" of coupons on a display of the smartphone so that they can be sequentially scanned at a point-of-sale. The customer smartphone or tablet screen is placed facing the Point-of-Sale scanner. The coupons carousel can be presented in an auto-forward way to scan all coupons in a single session.

Figure 4:
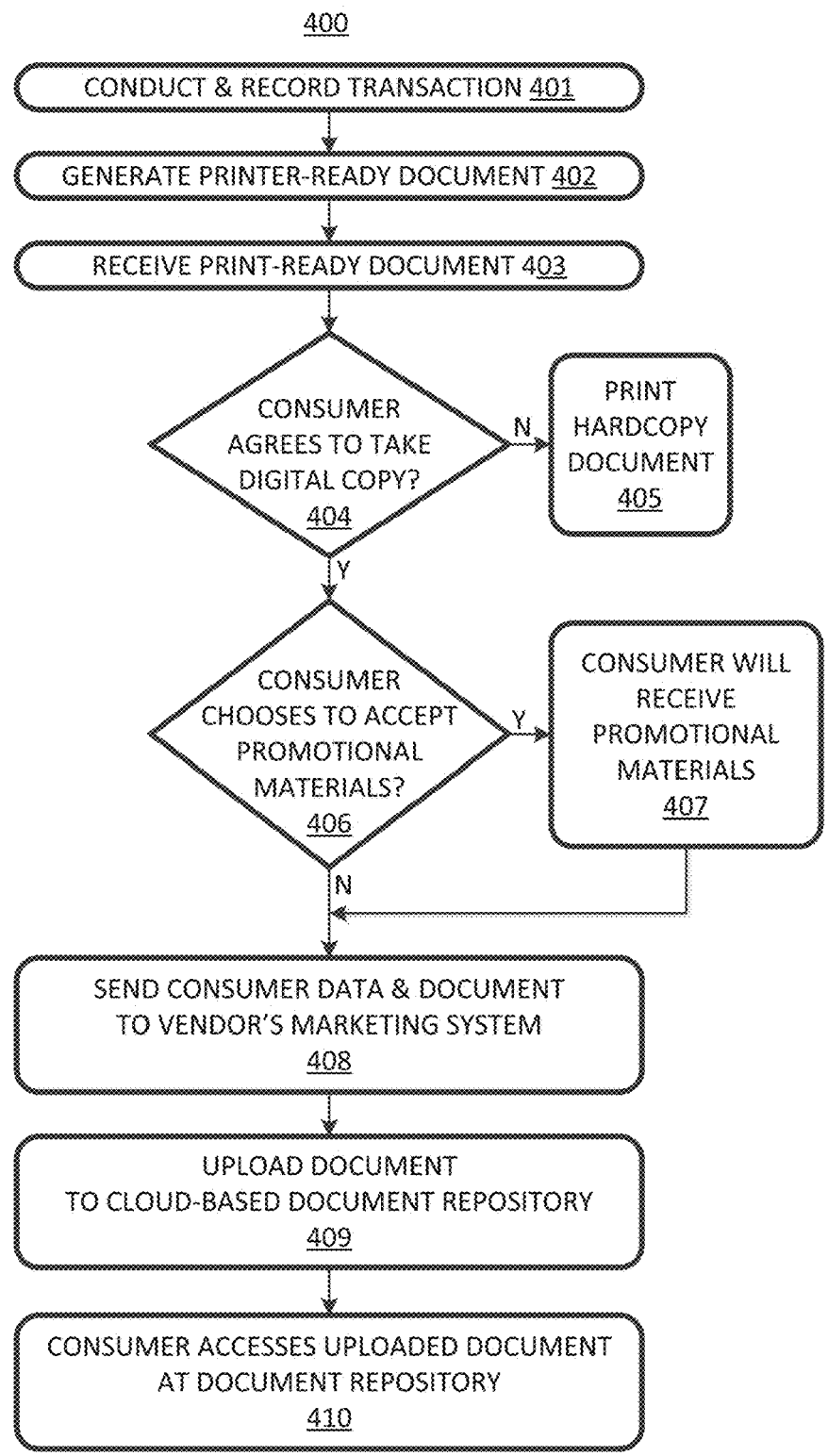
FIG. 4 is a flow chart of a process implementable in the document management system of FIGS. 1 and 2 and in other systems.

A process 400, flow-charted in FIG. 4, is implementable in document management systems 100 and 200, (e.g., using programs 322 and document app 348) and in other systems. At 401, a transaction is conducted and recorded. For example, a purchase of retail goods can be completed, and the purchase recorded by transaction register 120. In alternative embodiments or scenarios, no initial transaction is required. At 402, a printer-ready document is produced. The document can be a record of the transaction (e.g., a receipt) or other document (e.g., a coupon). At 403, the printer-ready document is transmitted and received, e.g., by a document gateway.

At 404, a determination is made whether a consumer accepts the opportunity to upload the document to the document repository. Acceptance means the consumer has chosen to upload a document to the cloud-based document repository. Rejection means the customer has chosen not to upload the document to the repository; in that case, the document may be printed, at 405, to render a paper document that can be provided to the consumer.

For example, acceptance of the upload opportunity can be made using a client device such as a smartphone, tablet, or a customer card. For example, a consumer can tap a document gateway with a smartphone to initiate transfer of a customer ID and customer profile from the smartphone to the document gateway, e.g., using an NFC connection. Alternatively, a consumer can swipe, or tap a customer NFC- or MST-enabled card using the card reader of the document gateway to transfer customer ID and profile data.

A determination that the opportunity has been rejected may be based on an explicit action, e.g., of a cashier, in response to an explicit indication by a customer that a printed document (receipt, coupon, gift card etc.) is wanted and an upload to the cloud is not wanted. Alternatively, the determination of rejection can be based on time elapsed since the printer-ready document was received by the document gateway or other criterion. In alternative embodiments, the document gateway can include one or more buttons to indicate: a) no digital or paper document is desired; b) only a digital document is desired; c) only a printed document is desired; or d) both digital and printed documents are desired.

At 406, the consumer can further choose, within the app, whether or not to accept future promotional materials, e.g., advertisements and coupons via email or social media. If the consumer chooses to accept, then, at 407, then the consumer will receive promotional materials in the future; otherwise, promotional materials will not be sent (unless the consumer agrees to accept promotional materials at some other time or in some other manner. Whether or not the consumer chooses, at 406, to accept promotional materials, consumer-identifying information (consumer ID and profile) and the document are sent, at 408, to the vendor's marketing system for use at least in market analysis.

In view of an agreement at 404, the document is also uploaded, at 409, to the document repository. An index of the repository may be updated to reflect the addition. Once a document has been uploaded to the cloud, it can be accessed, at 410, by the consumer after user authentication at the document service site. Consumer devices, e.g., smartphones 110 and 220 and laptops 112 and 232, tablets, and smart watches can be used to access the document at the document service site. The access can be from anywhere Internet service is provided, and not just from the location of the document-transfer system.

The services provided by an app or document services site 106 can extend beyond acting as a mere repository of documents. For example, document service site 234 can provide a database that can be used to sort and organize documents, e.g., by transaction date, contents, vendor, etc. Furthermore, Information can be extracted from the documents and used to support search, reports, analysis (e.g., budget analysis), forecasting, machine learning, and summaries.

In general the services provided by an app or the document service site can allow the consumer to retrieve all data that could have been obtained from the hardcopy document had it been generated. Following features are available to the customer in order to handle data. The consumer can preempt the printing of a paper artifact, e.g., receipt, coupon, or promotional flyer. The consumer can search and sort based on a string, a date, a location, or a vendor. The consumer can be provided with a one-stop email address that is not used for conversations, but that is used for all purchases, coupons, and promotions.

The consumer has access to a complete shopping history for all purchases. The consumer can group, categorize, and classify documents for better viewing and analysis. The services provided include collating and itemizing receipts, and generating an expense report. The collating activity can be done by grouping by merchant (i.e., vendor), a type of merchant (auto, departmental, clothing, groceries, etc.). Alternative, documents can be grouped according to chosen dates or date ranges. The app can provide an ability to generate real-time reports at a receipt level, a line item level, and a location basis etc. The search engine can include the ability to plot charts/graphs for data points. The app can also track the spending to warn of budget thresholds and to identify trends on a real-time basis. Reminder notifications can be provided, e.g., pertaining to a receipt that is about to reach its return expiry date or pertaining to a receipt with geo-fencing feature.

Additional services can provide the ability to share purchase details at an item-specific level in a social network. The app can assist in comparison-shopping for items. The app can have the ability to post a check-in or a check-out on a social network, at a merchant or a service provider location based upon the data provided in the header of the receipt.

As noted above, a document can be transferred to a consumer device and then to a document repository directly or back to a document gateway for transfer to the document repository. While the document is on the consumer device, the app can provide the ability to add a tip or service charge, sign a digital document on the consumer's smart device, and send a copy to the merchant. For example, at a restaurant customer can receive a bill, add a service charge (tip), sign the document, and tap a reader on the document gateway to send a signed copy to the merchant.

An app may also provide an ability to annotate, edit, and redact data from a document. The customer can choose to redact all or some portion of data that comes to it as a digital document along with the ability to retain and/or discard the original document. In a document containing itemized data, the customer can eliminate a line item and its corresponding quantifiable values (price, measurements, etc.), by redacting it in a single shot, and thus allow the final tally or total to be updated automatically. The customer can annotate the document by putting a custom image, or text at any place on it and making the annotations permanent on the document. Also, customer can flag the document for reference or instructions. The customer can also tag the document with keywords that can help in the future for a search or a lookup.

The app can also permit the consumer to share one or more documents, e.g., via email, fax, or a phone number, or sharing applications like Dropbox, etc. The app permits a document to be spliced so that only a portion of the document is shared, e.g., transferred to another person via NFC or Bluetooth or over a sharing session using WI-FI; in such a case, both persons can edit, annotate, and view the document portion at the same time.

By providing a consumer with the foregoing capabilities, a vendor/provider better serves consumers and obtains an advantage over competitors that do not provide the services. Also, the provider obtains immediate access to consumer email addresses, e.g., for lead generation. Customer acquisition cost is essentially zero. The consumer is not required to fill out a form, so there is no delay that might hold up a check-out lane, for example. Promotions and coupons can be personalized. Furthermore, foregoing printing saves on printing supplies such as paper and ink.

Document gateways 112 and 210 are standalone hardware devices separate from other document transfer devices. In other embodiments, the document gateway can be integrated into another device. For example, a document gateway can be integrated into a payment gateway, a transaction register, or a printer. An advantage of a separate document gateway device is that it can easily be implemented in existing transaction-systems as a plug-and-play or a software driver-installed device. The document gateway can include a network interface for uploaded to the document repository and a consumer data interface for communicating with a consumer device. In cases where a document is uploaded to a document repository via the consumer device, the consumer data interface serves as the network interface.

Herein, "cloud" refers to virtualized remote computing resources that can be accessed over the Internet or other network. Cloud storage is a model of data storage where the digital data is stored in logical pools, the physical storage spans multiple servers (and often locations), and the physical environment is typically owned and managed by a hosting company. These cloud storage providers are responsible for keeping the data available and accessible, and the physical environment protected and running. "Wi-Fi", as used herein, refers to a local area wireless technology that allows an electronic device to participate in computer networking using 2.4 GHz UHF and 5 GHz SHF ISM radio bands. Herein, a "print-ready document" is a document in a form that can be accepted by a printer for printing. Herein, art labeled "prior art", if any, is admitted prior art; art not labeled "prior art" is not admitted prior art.

Interfacing with the merchant must be put in the document gateway (over Bluetooth). The Document Gateway System needs to be configured before it can be used at the merchant location. Since it may not have a user interface screen, it needs be configured using a mobile application over Bluetooth interface 362. The configuration can involve providing the network connectivity details. It can also involve loading a form with background images (including image text) and pre-formatted sections. Many printers print formatted data in different sections of a form. That data does not come with context. The underlying form provides the images, logos, boundaries and the section-headings and the necessary subtext to provide the context to the printer-ready data that arrives from the system. Together, data and the form make the complete document.

The merchant flyers containing advertisements and coupons come to the customer repository with images of the items being sold. The merchant can be asked to provide metadata for each individual image. Many times, an image contains both the advertised price and the offered discount. While the merchant provides the image, e.g., coupon, the customer app or website can offer a "buy/cancel" button on each image for the customer to buy the item right from the coupon image with a single-tap or a single-click at the advertised price and with the coupon price applied. The choice of picking up the merchandize from the merchant location, or getting it delivered (free, or at a price) needs to be preconfigured for such purchases. In the customer app or website for a single customer account, these settings can differ from merchant to the other.

Variations upon and modifications to the disclosed embodiments are within the scope of the invention, which is defined by the following claims.

What is claimed is:

1. A document gateway comprising:
   a printer input port for receiving a printer-ready transaction document;
   a printer output port for, after the transaction document has been received by the printer input port, transmitting the transaction document to a printer;
   a consumer data interface for receiving consumer data from a consumer device, the consumer data identifying and profiling a document consumer;
   a network interface; and
   a controller for determining whether,
      a consumer has provided the consumer data via the consumer data interface, in which case, the controller causes the transaction document, after the transaction document had been received by the printer input port, to be uploaded to a document repository via the network interface, or
      a consumer has not provided the consumer data, in which case, the controller causes the transaction document that had been previously received at the printer input port to be forwarded to the printer via the printer output port to produce a hard copy of the transaction document.

2. The document gateway of claim 1 wherein the consumer data input includes at least one of a Near-Field Communications (NFC) interface, a Magnetic Secure Transmissions (MST) interface, and a consumer-card reader.

3. The document gateway of claim 1 wherein the controller is configured, in the event that it is determined that the consumer has accepted an opportunity, to transfer the consumer data to a vendor marketing system via the network interface.

4. The document gateway of claim 3 wherein the network interface includes at least one of an Ethernet interface, a Wi-Fi interface, and a cellular interface.

5. The document gateway of claim 1 wherein the controller is configured to, in the event it is determined that the consumer has provided the consumer data, respond to an indication from the consumer whether or not the consumer wishes to accept promotional material.

6. The document gateway of claim 1 wherein the printer input port is a Universal Serial Bus (USB) device port and the printer output port is a USB host port.

7. A process comprising:
   receiving, by a document gateway and via a printer input port of the document gateway, a printer-ready transaction document;
   determining whether identity and profile information regarding a consumer has been received via a consumer-data interface of the document gateway or is not going to be received;
   in the event the identity and profile information has been received, forwarding the transaction document that had been received via the printer input port to a cloud-based document repository; and
   in the event it is determined that consumer identity and profile information is not going to be received, causing the transaction document that had been received via the printer input port to be transmitted to a printer via the printer output port and not forwarding the transaction document to the cloud-based document repository.

8. The process of claim 7 further comprising the consumer accessing the transaction document while it is stored in the document repository.

9. The process of claim 7 further comprising gathering documents for the consumer from multiple transactions involving multiple vendors.

10. The process of claim 9 further comprising generating an index to the document repository, the index matching documents in the document repository to metadata respectively associated with the documents.

11. The process of claim 10 further comprising the consumer accessing cumulative information based on information obtained from plural ones of the documents stored in the document repository.

12. The process of claim 7 further comprising transferring the consumer identity and profile information to a vendor's marketing system for use in a vendor's marketing efforts.

13. The process of claim 7 further comprising a consumer operating a handheld device so as to transfer the consumer-identity and profile information to the document gateway that causes the document to be forwarded to the cloud-based document repository.

14. The process of claim 13 further comprising the consumer using the handheld device to indicate whether or not the consumer-is willing to accept promotional materials.

15. The process of claim 7 wherein the printer input port is a Universal Serial Bus (USB) device port and the printer output port is a USB host port.

* * * * *